(12) United States Patent
Okada et al.

(10) Patent No.: US 7,136,426 B2
(45) Date of Patent: Nov. 14, 2006

(54) COMMUNICATION SYSTEM INCLUDING A WIRE NETWORK LINKED WITH ANOTHER NETWORK VIA RADIO WAVES

(75) Inventors: Minoru Okada, Nagoya (JP); Yutaka Aoki, Nisshin (JP); Manabu Sawada, Yokohama (JP); Masahiro Kuwabara, Yokosuka (JP); Hiroshi Harada, Yokosuka (JP); Masayuki Fujise, Yokosuka (JP)

(73) Assignees: Denso Corporation, Kariya (JP); National Institute of Information and Communications Technology, Tokyo (JP)

( * ) Notice: Subject to any disclaimer, the term of this patent is extended or adjusted under 35 U.S.C. 154(b) by 1096 days.

(21) Appl. No.: 10/020,164

(22) Filed: Dec. 18, 2001

(65) Prior Publication Data

US 2002/0094035 A1 Jul. 18, 2002

(30) Foreign Application Priority Data

Dec. 19, 2000 (JP) ............................. 2000-385424

(51) Int. Cl.
*H04L 27/12* (2006.01)
*H04L 12/24* (2006.01)
*H04L 5/14* (2006.01)

(52) U.S. Cl. ...................... 375/295; 370/254; 370/278

(58) Field of Classification Search ................ 375/295; 370/463, 475, 370, 254, 278; 398/23, 115, 398/186, 398; 709/230, 709
See application file for complete search history.

(56) References Cited

U.S. PATENT DOCUMENTS 4,739,183 A * 4/1988 Tokura et al. ............... 307/9.1
5,159,479 A * 10/1992 Takagi ........................ 398/116
5,253,097 A * 10/1993 Naito et al. ................. 398/205
5,339,187 A * 8/1994 Nelson ........................ 398/91
5,375,007 A * 12/1994 O'Neill ....................... 398/115
5,710,651 A * 1/1998 Logan, Jr. ................... 398/168
5,822,307 A * 10/1998 Eastmond et al. .......... 370/278
5,838,926 A * 11/1998 Yamagishi .................. 709/249
5,973,812 A * 10/1999 Imai et al. .................. 398/192
5,982,762 A * 11/1999 Anzai et al. ................ 370/338
6,078,414 A * 6/2000 Iwano ........................ 398/182
6,091,940 A * 7/2000 Sorrells et al. ............. 455/118

(Continued)

FOREIGN PATENT DOCUMENTS

JP  A-5-235868  9/1993

(Continued)

*Primary Examiner*—Emmanuel Bayard
*Assistant Examiner*—Lawrence B. Williams
(74) *Attorney, Agent, or Firm*—Posz Law Group,PLC (57) ABSTRACT

A vehicle-vehicle communication system includes an in-vehicle wire LAN established in a vehicle. The in-vehicle wire LAN includes a plurality of devices connected by optical fiber links. A terminal for radio vehicle-vehicle communication is connected to the in-vehicle wire LAN by the optical fiber link. The terminal receives an optical digital signal in a predetermined format from the in-vehicle wire LAN. The terminal includes a light controlled oscillator and applies the received optical signal to the light controlled oscillator. The light controlled oscillator outputs a transmission signal of a frequency shifted from a predetermined frequency according to the intensity of the applied optical signal. Thus the terminal generates the transmission signal using FSK-modulation technique without converting the format of the optical signal into another format. The transmission signal is transmitted to a device in another vehicle via radio waves.

13 Claims, 5 Drawing Sheets

U.S. PATENT DOCUMENTS

| | | | |
|---|---|---|---|
| 6,157,321 A * | 12/2000 | Ricci | 340/902 |
| 6,377,782 B1 * | 4/2002 | Bishop et al. | 455/3.01 |
| 6,405,132 B1 * | 6/2002 | Breed et al. | 701/301 |
| 6,452,714 B1 * | 9/2002 | Rollins | 359/325 |
| 6,459,519 B1 * | 10/2002 | Sasai et al. | 398/183 |
| 6,539,028 B1 * | 3/2003 | Soh et al. | 370/445 |
| 6,665,285 B1 * | 12/2003 | Treadaway et al. | 370/338 |
| 6,754,183 B1 * | 6/2004 | Razavi et al. | 370/254 |
| 6,895,185 B1 * | 5/2005 | Chung et al. | 398/72 |
| 2002/0105423 A1 * | 8/2002 | Rast | 340/479 |
| 2004/0258414 A1 * | 12/2004 | Lee | 398/115 |

FOREIGN PATENT DOCUMENTS

| | | |
|---|---|---|
| JP | A-11-88265 | 3/1999 |
| JP | A-11-112409 | 4/1999 |
| JP | A-2000-308165 | 11/2000 |

* cited by examiner

COMMUNICATION SYSTEM INCLUDING A WIRE NETWORK LINKED WITH ANOTHER NETWORK VIA RADIO WAVES

CROSS REFERENCE TO RELATED APPLICATION

This application is based upon and claims the benefit of Japanese Patent Application No. 2000-385424 filed on Dec. 19, 2000, the contents of which are incorporated herein by reference.

BACKGROUND OF THE INVENTION

1. Field of the Invention

The present invention relates to a communication system in which a wire communication network is linked with another wire communication network or radio devices via radio waves.

2. Related Art

It is proposed that a vehicle controls itself for safety based on information gathered from various sensors disposed therein and/or radars disposed thereon for detecting obstacles around the vehicle. However, the radar for detecting obstacles in front can detect only the preceding vehicle, that is, it cannot detect vehicles running before the preceding vehicle. Therefore a driver should see the vehicles in front with his/her own eyes for preventing his/her vehicle from being involved in a road traffic accident such as a pileup. That is, the control based on the information from the radar does not effectively prevent the vehicle from being involved in the traffic accident.

It is further proposed that a driver in a moving vehicle obtains information on a traffic jam or the like utilizing vehicle-road communication which is performed between on-board equipment (OBE) installed on the vehicle and road-side units (RSUs) provided in the vicinity of roads. However, the vehicle sometimes runs out of the communication area or within an area in which communication with the RSU is temporarily impossible. Such an area is formed by, for example, other vehicles that shadow the vehicle. When the vehicle is stuck in traffic, it may stay out of the communication area for a relatively long time. Accordingly, the vehicle is not always able to communicate with the RSU, and therefore the driver is not necessarily able to obtain the information timely.

Then it is proposed that vehicle-vehicle communication, which is performed between the vehicles, is utilized in order to overcome the above problems. If the vehicle-vehicle communication is possible, the vehicle can obtain the information from other vehicles. Then the vehicle can control itself based on the obtained information so as to prevent itself from being involved in a traffic accident. Further a vehicle, which has obtained the information from the RSU by the vehicle-road communication, may relay the obtained information to another vehicle. Thus the vehicle, which cannot communicate with the RSU, can indirectly obtain the information provided by the RSU.

Further, it is proposed that devices, which are installed in or brought into the vehicle, are interconnected so that an in-vehicle LAN is established. The devices belonging to the in-vehicle LAN include vehicle-road communication equipment, vehicle-vehicle communication equipment, vehicle navigation equipment, a portable information device, ECUs and the like. If the in-vehicle LAN is thus established, the devices belonging to the in-vehicle LAN can share various information and consequently the vehicle can control itself with more sophistication.

Further, the devices belonging to the in-vehicle LAN can exchange the various information with devices belonging to another in-vehicle LAN established in another vehicle by the vehicle-vehicle communication via the vehicle-vehicle communication equipment. As a result, the driver or an occupant can obtain highly developed information.

However, the frame format or signal format of a signal transmitted via wires are usually different from that of a signal transmitted via radio waves. Therefore the vehicle-vehicle communication equipment connected to the in-vehicle LAN should translate the format of a received signal into the format employed by the in-vehicle LAN, and the format of a signal to be transmitted into the format for radio communication. The communication equipment capable of such translation is complex and expensive.

SUMMARY OF THE INVENTION

The present invention has an object to simplify the construction of a terminal connected to a wire LAN for radio communication with another wire LAN or radio devices.

According to the present invention, a communication systen includes a wire communication network and a terminal connected thereto for radio communication. In the wire communication network, devices are connected by a wire link and communicate a baseband signal in a particular predetermined format with one another via the wire link. The terminal is connected to the wire communication network by the wire link, and receives the baseband signal from the devices belonging to the wire communication network. The terminal modulates a carrier wave using the received baseband signal into a transmission signal without translating the particular predetermined format of the baseband signal into another format. The transmission signal is transmitted from the terminal via radio waves.

Preferably, the wire link is an optical fiber link. In this case, the baseband signal received by the terminal is an optical signal, and the terminal modulates the carrier wave using the received optical signal into the transmission signal without converting the optical signal into an electrical signal.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENT

Figure 1A:
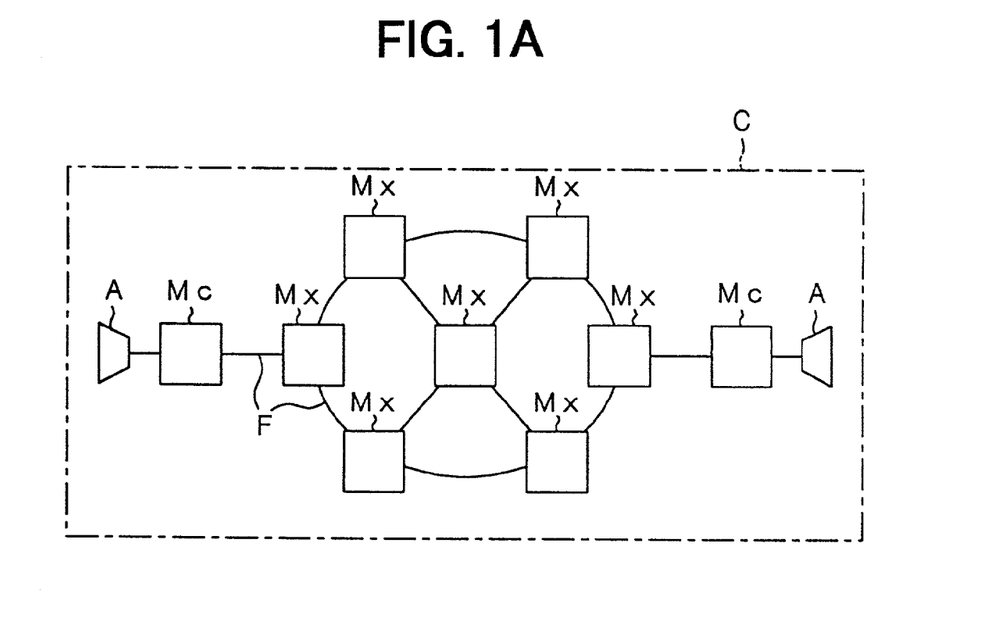
FIG. 1A is a block diagram showing an in-vehicle wire LAN belonging to a vehicle-vehicle communication system according to an embodiment of the present invention.

A vehicle-vehicle communication system according to an embodiment of the present invention includes an in-vehicle wire LAN established in a vehicle. Referring to FIG. 1A, the in-vehicle wire LAN is formed with a plurality of devices connected by optical fiber links F in the vehicle C. The devices include information/control devices Mx used by an occupant, and terminals (vehicle-vehicle communication terminals) Mc for enabling the in-vehicle LAN to communicate with another vehicle.

The information/control devices Mx include vehicle navigation equipment, a TV receiver, an audio apparatus such as a CD player or an MD player, and a portable information device such as a cellular phone or a notebook computer. The terminals Mc transmit and receive electric waves of a radio frequency via antenna units A. Specifically, the terminals Mc transmit and receive millimeter-waves of 60 GHz in the present embodiment. However, microwaves of another frequency may be employed instead of the millimeter-waves of 60 GHz. The antenna units A are mounted on the vehicle, and the communication terminals Mc are provided correspondingly to the respective antenna units A.

Each of the information/control devices Mx has a LAN interface portion for enabling communication via the optical fiber links F. The LAN interface portion includes an electrical-optical (E/O) converter, an optical-electrical (O/E) converter, and a transceiver. The E/O converter receives an electrical pulse signal, and intensity-modulates an optical signal using the received electrical pulse signal into an optical pulse signal. The O/E converter receives an optical pulse signal, and modulates an electrical signal using the received optical pulse signal to an electrical pulse signal. The transceiver transmits and receives data in a predetermined frame format at a predetermined speed (e.g., 50 Mbps) via the optical fiber links F.

The E/O converter includes a laser diode that emits an infrared signal of a wavelength of 1.55 μm. The intensity of the infrared signal (output signal) varies depending on the voltage of the received electrical signal (input signal). The O/E converter includes a photo diode that receives an infrared signal of a wavelength of 1.55 μm, and outputs an electrical signal. The voltage of the electrical signal (output signal) varies depending on the intensity of the received infrared signal (input signal).

Dispersion shift fibers having a zero dispersion at wavelength of 1.55 μm are employed for the optical fiber links F. Alternatively durable plastic optical fibers may be employed for the optical fiber links F. In this case, a laser diode which emits an optical signal of a wavelength of 0.6 μm and a photo diode which receives an optical signal of a wavelength of 0.6 μm should be employed as the E/O converter and the O/E converter, respectively.

The transceiver enables the information/control device Mx to communicate with the other information/control devices Mx using CSMA/CD (Carrier Sense Multiple Access with Collision Detection) technique. That is, the transceiver receives an electrical pulse signal (digital baseband signal), which is to be transmitted, and outputs it to the E/O converter at a proper time so that the corresponding optical pulse signal outputted from the E/O converter is successfully transmitted via the optical fiber links F. Further the transceiver receives an electrical pulse signal from the O/E converter when the corresponding optical pulse signal is received via the optical fiber links F.

However, the in-vehicle LAN may employ a communication control technique other than CSMA/CD technique according to the topology of the in-vehicle LAN. The in-vehicle LAN may be formed as a star network, a ring network, a bus network or the like.

Figure 1B:
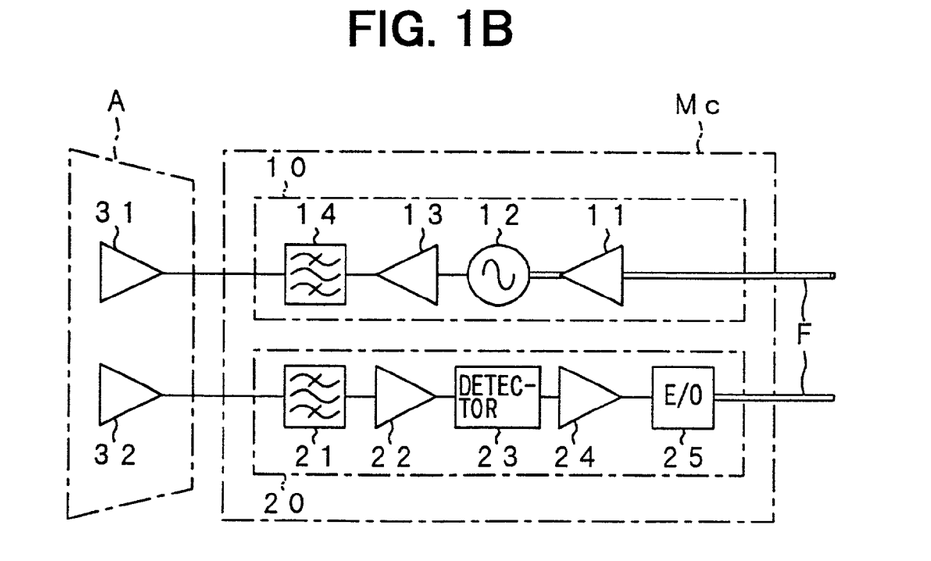
FIG. 1B is a block diagram showing a terminal connected to the in-vehicle wire LAN for vehicle-vehicle communication.

Referring to FIG. 1B, each of the terminals Mc includes a transmitter portion 10 and a receiver portion 20. The transmitter portion 10 includes a light amplifier 11, a light controlled oscillator (LCO) 12, an amplifier 13, and a band pass filter (BPF) 14.

The light amplifier 11 receives, via the optical fiber link F, an optical pulse signal to be transmitted via radio waves, and amplifies it. The amplified optical signal is applied to the LCO 12. The LCO 12 nominally oscillates at a radio frequency of 60 GHz, and its oscillation frequency is shifted by an amount according to the intensity of the applied optical signal.

Figure 2:
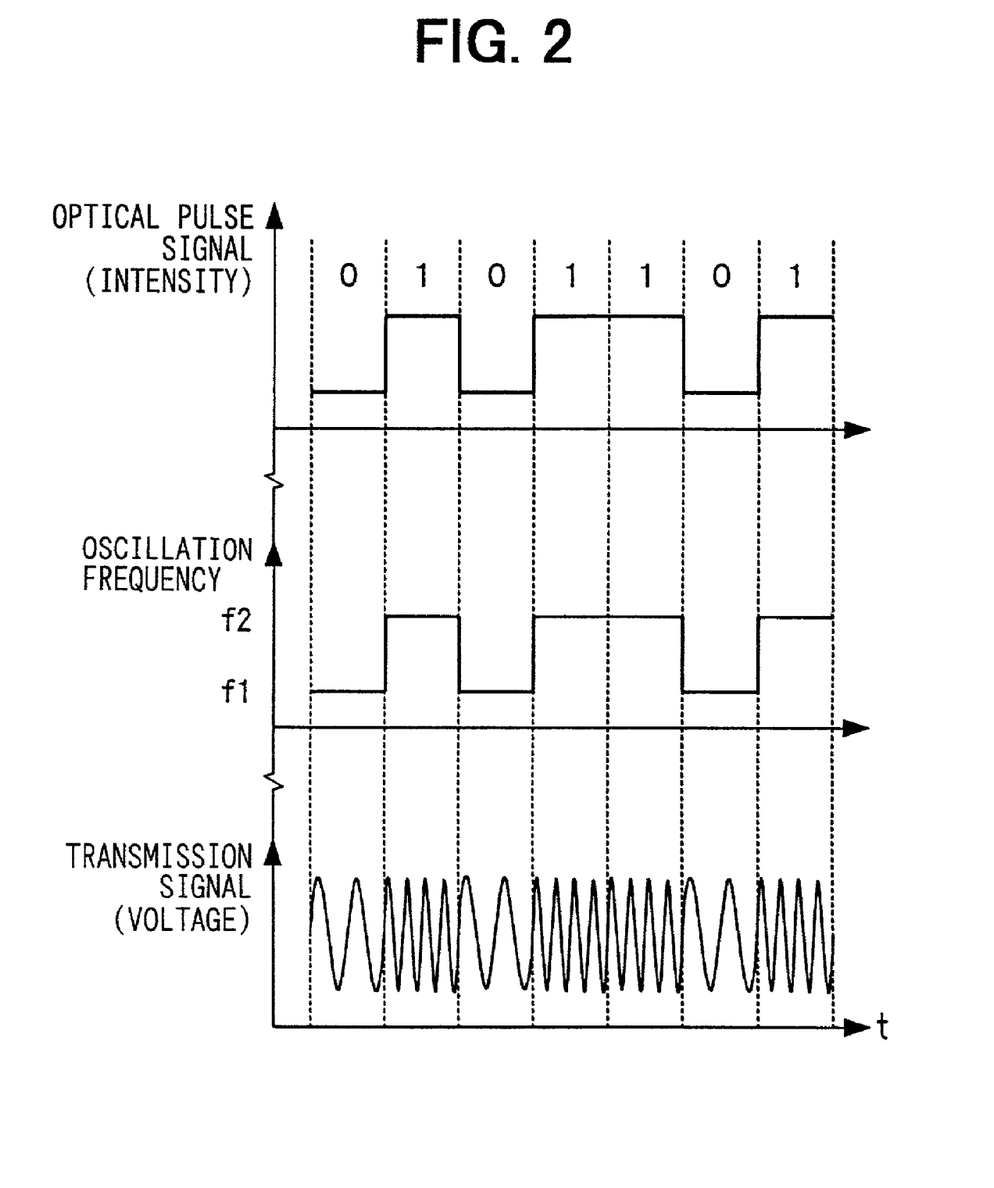
FIG. 2 is graph representation showing how the transmitter of the terminal modulates a carrier wave using a signal to be transmitted.

Referring to FIG. 2, the intensity of the optical signal corresponding to bit data '0' is lower level, while the intensity of the optical signal corresponding to bit data '1' is higher level. Therefore the oscillation frequency is shifted into a lower frequency or a higher frequency. Thus a signal of 60 GHz generated by the LCO 12 is FSK (frequency shift keying)-modulated using the optical signal from the light amplifier 11 into a signal of the lower frequency or the higher frequency, and the resultant signal is outputted from the LCO 12.

The amplifier 13 amplifies the signal outputted from the LCO 12. The undesired frequency component of the amplified signal is eliminated through the BPF 14. Then the signal outputted from the BPF 14 is transmitted to another vehicle via the transmitting antenna 31 of the antenna unit A.

The receiver portion 20 includes a BPF 21, an amplifier 22, a detector/demodulator 23, an amplifier 24, and an E/O converter 25. The E/O converter is the same as that included in the LAN interface portions of the information/control devices Mx.

The receiver portion 20 receives a signal of 60 GHz via the receiving antenna 32 of the antenna unit A, and the undesired frequency component of the received signal is eliminated through the BPF 21. The amplifier 22 amplifies the signal outputted from the BPF 21. The detector/demodulator 23 demodulates the amplified signal into an electrical pulse signal. The amplifier 24 amplifies the electrical pulse signal, and then the E/O converter 25 converts the amplified electrical pulse signal into an optical pulse signal. The optical pulse signal is transmitted from the E/O converter 25 over the optical fiber link F.

The LCO 12 of the transmitter portion 10 is an oscillator that includes a HEMT (High Electron Mobility Transistor) module and oscillates at a radio frequency. The HEMT module includes one or more InAlAs/InGaAs type HEMTs. The HEMT module is arranged so that the optical pulse signal amplified by the light amplifier 11 is applied to the HEMTs. The frequency characteristic of the HEMT varies depending on the intensity of the optical pulse signal applied thereto. Therefore the oscillation frequency of the LCO 12 shifts by an amount of several dozen MHz in response to the applied optical signal.

The light amplifier 11 is constructed so that its gain is adjustable. That is, the intensity range of the optical signal applied to the LCO 12 is adjustable. In the present embodiment, the gain of the light amplifier 11 is adjusted so that the intensity of the optical signal varies within a predetermined range.

An amplifier that includes a low noise amplifier (LNA) and a limiting amplifier is employed as the amplifier 22 of the receiver portion 20, because the amplifier 22 should amplify a signal that is low level and fluctuates largely.

Further, an asynchronous detector, which asynchronously converts the shift amount of the frequency of the received signal directly into a voltage, may be employed as the detector/demodulator 23. Alternatively, a synchronous detector, which demodulates the received FSK signal using a signal that has the same frequency as the central frequency of the received signal and is inphase with the received signal, may be employed as the detector/demodulator 23. Further the detector/demodulator 23 may down-convert the received signal of a radio frequency into a signal of an intermediate frequency (IF) before it demodulates the received signal.

Thus, the terminal Mc receives an optical pulse signal, and modulates a carrier wave using the received optical pulse signal into a transmission signal to be transmitted via radio waves without converting the received optical signal into an electrical signal and without translating the frame format of the received optical pulse signal. That is, the present communication system employs the same frame format for both of the wire communication and radio communication. It is preferable that a frame format that includes error-correcting code is employed. Further it is preferable that a frame format for radio communication, in which relatively many bits of the frame are assigned to the error-correcting code, is employed for both of the wire communication and radio communication.

Figure 3:
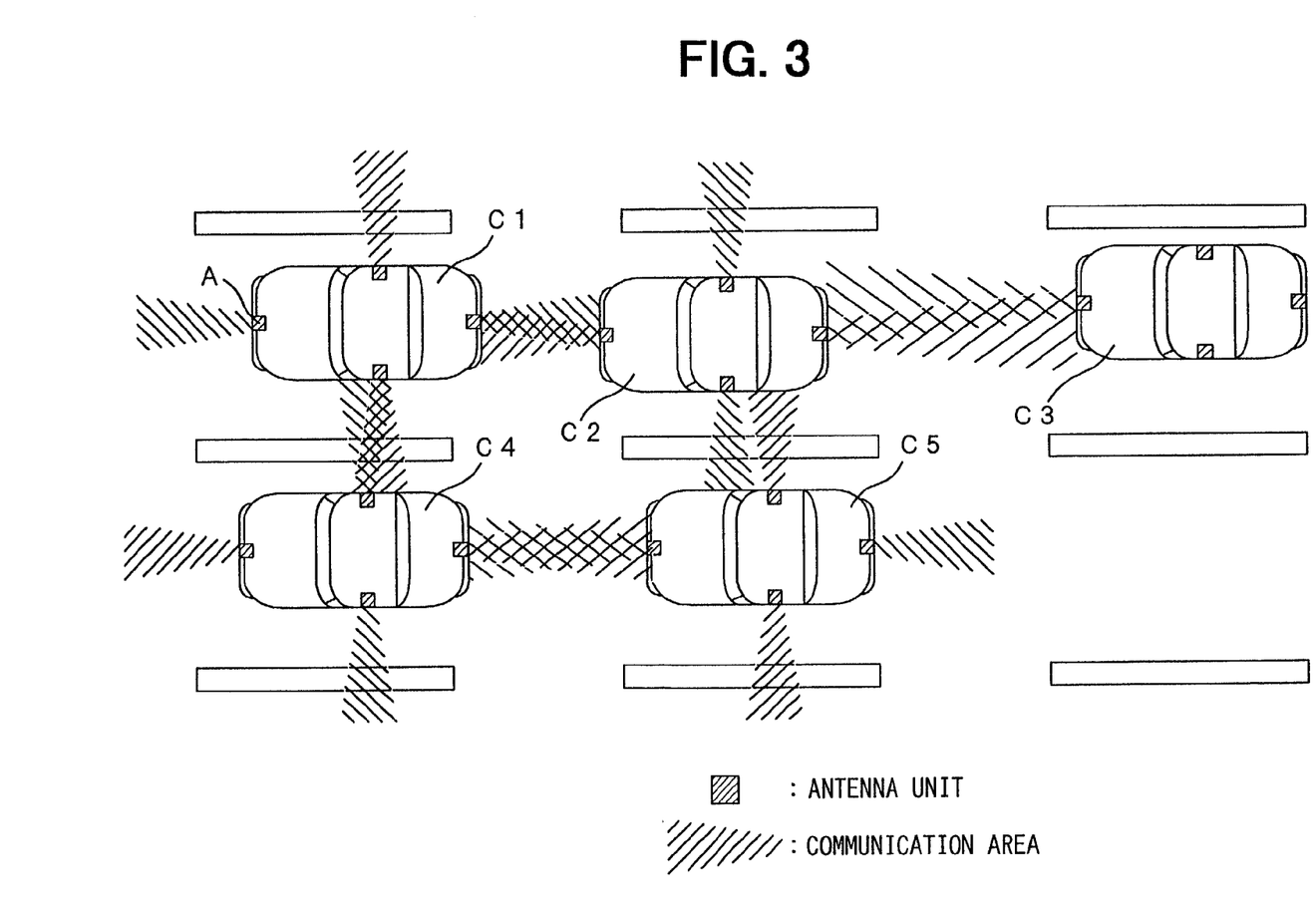
FIG. 3 is a pictorial diagram showing the vehicle-vehicle communication system.

Referring to FIG. 3, the antenna units A are arranged on the front end, the rear end and both sides of the vehicle, respectively. However, more or less antennas may be employed. Highly directive antennas are employed as the transmitting antenna and the receiving antenna of each of the antenna units A so as to enable the corresponding terminal Mc to perform one-to-one communication with a vehicle in a predetermined communication area. The communication area is a sector area defined by two lines that have a predetermined length and cross at the position of the antenna unit A at a predetermined angle.

The antenna units A arranged on the front end and rear end of the vehicle enable the in-vehicle LAN to stably perform vehicle-vehicle communication with the preceding vehicle and the following vehicle running in the same direction. The antenna units A arranged on both sides of the vehicle enable the in-vehicle LAN to stably perform vehicle-vehicle communication with vehicles running in the same direction in the next lanes.

The antenna unit A arranged on the front end of the vehicle further enables the in-vehicle LAN to perform vehicle-vehicle communication with a vehicle running in the opposite lane immediately before the vehicles pass each other. The antenna unit A arranged on the rear end of the vehicle further enables the in-vehicle LAN to perform vehicle-vehicle communication with an oncoming vehicle running in the opposite lane immediately after the vehicles pass each other. Thus, the in-vehicle LAN can obtain information that was obtained by the oncoming vehicle. The oncoming vehicle obtained the information at a place that is ahead of the vehicle in which the in-vehicle LAN is installed.

In FIG. 3, the direct vehicle-vehicle communication is possible between the vehicles C1 and C2, between the vehicles C2 and C3, between the vehicles C4 and C5, and between the vehicles C1 and C4. That is, the direct vehicle-vehicle communication is impossible between the other pairs of the vehicles C1–C5. However, the in-vehicle LANs of the respective vehicles C1–C5 are linked serially via radio waves in the order C3-C2-C1-C4-C5, so that they together form a single LAN.

Then each of the information/control devices Mx belonging to the in-vehicle LAN can communicate with the information/control devices belonging to another in-vehicle LAN in the same manner as it communicates with the information/control devices Mx belonging to the same in-vehicle LAN. In this way, the information/control devices Mx in a plurality of vehicles exchange and share various information.

In the present vehicle-vehicle communication system, the terminal Mc receives an optical pulse signal via the optical fiber link F, and FSK-modulates a carrier wave using the received optical pulse signal into a transmission signal without converting the received optical pulse signal into an electrical signal and without translating the frame format of the received optical signal as described above. Accordingly, the construction of the terminal Mc can be simplified. As a result, the terminal Mc can be miniaturized and manufactured inexpensively.

Further in the present vehicle-vehicle communication system, the optical fiber links F are employed for connecting the devices Mx, Mc in the in-vehicle LAN as described above. Therefore signals can be transmitted at a high speed within the in-vehicle LAN. Moreover, each of the devices Mx, Mc is immune to electrical noises generated in the other devices Mx, Mc, because the devices Mx, Mc are electrically isolated from one another by the optical fiber links F. Further optical fiber links F are not required to be equipped with shields for isolating electrical noises, because the electrical noises are not superimposed on the optical fiber links F. As a result, wiring which forms the optical fiber links F is simplified.

In the present vehicle-vehicle communication system, microwaves, especially millimeter-waves, are employed for the vehicle-vehicle communication, because the microwaves have a tendency to propagate rectilinearly. In the case that the millimeter-waves are employed, communication areas corresponding to the respective antenna units A can be successfully overlapped with one another, because the millimeter-waves are superior in attenuation property. Accordingly the millimeter-waves are suitable for employing for the vehicle-vehicle communication that is performed between vehicles which are at a short distance from each other.

Modifications

Figure 4A:
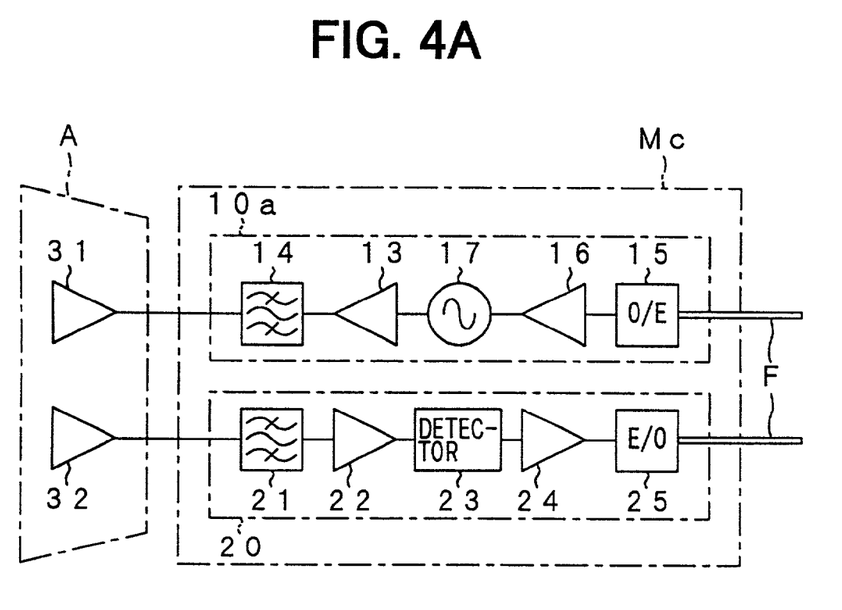
FIG. 4A is a block diagram showing a terminal connected to an in-vehicle wire LAN belonging to a vehicle-vehicle communication system according to a modification of the embodiment.

In the above embodiment, the terminal Mc may employ another transmitter portion 10a as shown in FIG. 4A instead of the transmitter portion 10 of FIG. 1B. The transmitter portion 10a includes an O/E converter 15, an electric amplifier 16, and a voltage controlled oscillator (VCO) 17 instead of the light amplifier 11 and the LCO 12.

The O/E converter 15 receives an optical pulse signal via the optical fiber link F, and converts the received optical pulse signal into an electrical pulse signal. The amplifier 16 amplifies the electrical pulse signal outputted from the O/E converter 15. A signal generated by the VCO 17 is FSK-modulated using the output signal of the amplifier 16, and the resultant signal is outputted from the VCO 17.

Figure 4B:
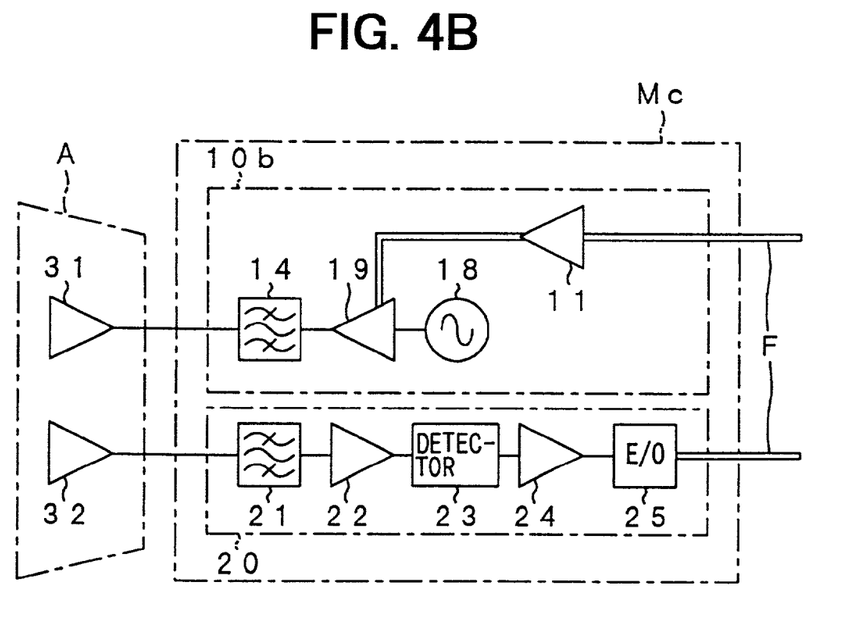
FIG. 4B is a block diagram showing a terminal connected to an in-vehicle wire LAN belonging to a vehicle-vehicle communication system according to another modification of the embodiment.

Moreover, the terminal Mc may employ another transmitter portion 10b as shown in FIG. 4B instead of the transmitter portion 10 of FIG. 1B. The transmitter portion 10b includes an oscillator 18 and a variable amplifier 19 instead of the LCO 12 and the amplifier 13.

The oscillator 18 oscillates at a constant frequency. The optical pulse signal amplified by the light amplifier 11 is applied to the variable amplifier 19, and the gain of the amplifier 19 varies depending on the intensity of the amplified optical pulse signal. The variable amplifier 19 amplifies the output signal of the oscillator 18, so that the output signal of the oscillator 18 is amplitude-modulated using the optical pulse signal. An amplifier that includes one or more HEMTs similarly to the LCO 12 of FIG. 1B may be employed as the variable amplifier 19. The frequency characteristic of the HEMTs varies depending on the intensity of the applied optical signal.

Figure 5A:
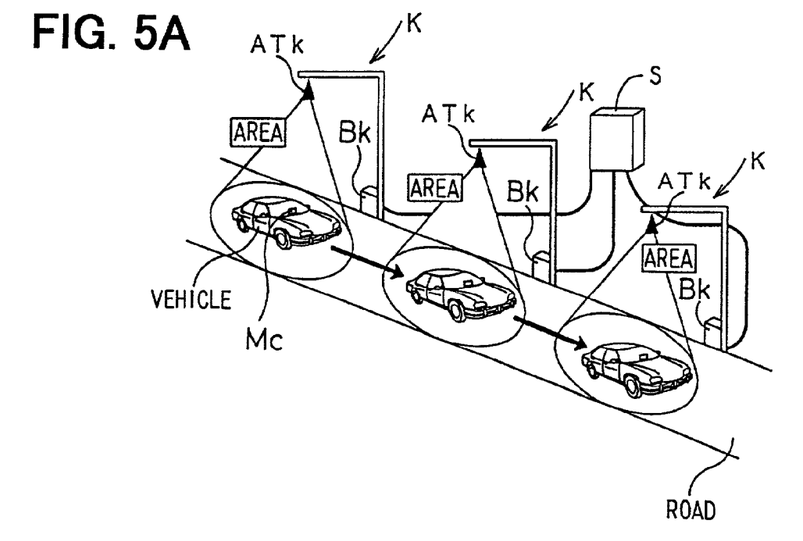
FIG. 5A is a pictorial diagram showing a vehicle-road communication system provided as another modification of the embodiment.

Moreover, in the above embodiment, the in-vehicle LAN may be linked with a network or radio devices other than an in-vehicle LAN established in another vehicle via the terminals Mc. For example, the in-vehicle LAN may be linked with RSUs K installed in the vicinity of roads as shown in FIG. 5A. In this case, vehicle-road communication is performed via the terminals Mc, and the information/control devices Mx should be able to handle a signal in the frame format employed by the vehicle-road communication.

Each of the RSUs K includes an antenna ATk and the body Bk. Further, the RSUs K may belong to a wire communication network which further includes a control station S. That is, the in-vehicle LAN may be linked with the wire communication network established in the vicinity of the road via the terminals Mc. In this case, a device which has the same construction as the terminal Mc is employed as the body Bk of the RSU K.

Figure 5B:
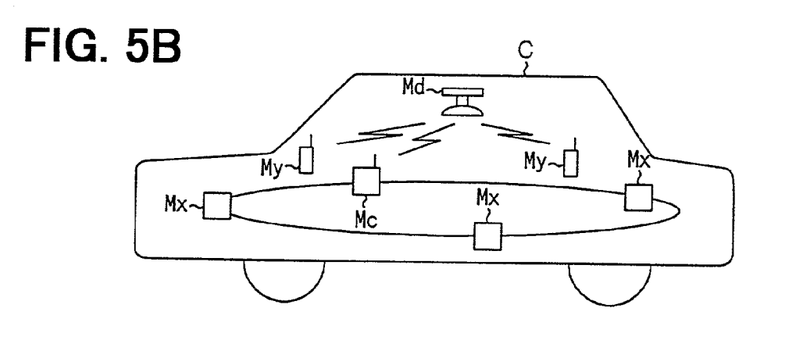
FIG. 5B is a pictorial diagram showing a communication system in which an in-vehicle wire LAN is linked with an in-vehicle wireless LAN via radio waves.

Furthermore, the in-vehicle LAN may be linked with an in-vehicle wireless LAN established in the same vehicle via the terminals Mc as shown in FIG. 5B. The in-vehicle wireless LAN includes a base station Md and radio information/control devices My. the radio information/control devices My are linked with one another via the base station Md. Therefore the radio information/control devices My can communicate with one another via radio waves within in-vehicle wireless LAN.

According to the present modification, the information/control devices Mx, My belonging to the in-vehicle wire LAN and the in-vehicle wireless LAN together form a single LAN. That is, each of the information/control devices Mx belonging to the in-vehicle wire LAN can communicate with the information/control devices My belonging to the in-vehicle wireless LAN in the same manner as it communicates with the information/control devices Mx.

Figure 6:
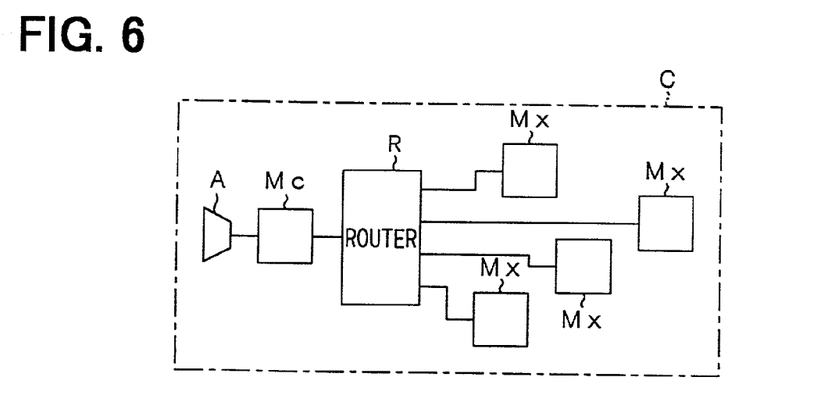
FIG. 6 is a block diagram showing a modification of the in-vehicle wire LAN of FIG. 1.

In the above embodiment, it is preferable that the terminal Mc is connected to the in-vehicle wire LAN via a router R for routing as shown in FIG. 6, because the in-vehicle wire LAN may perform vehicle-vehicle communication with wire LANs of relatively many vehicles. If the router R is connected between the information/control devices Mx and the terminal Mc, a signal which should be transmitted within the in-vehicle LAN is prevented from being transmitted to another in-vehicle LAN. As a result, the load on the terminal Mc is reduced and traffic congestion in the communication system is prevented. Further the router R prevents traffic congestion in the in-vehicle LAN.

In the above embodiment and modifications, devices other than the devices used by the occupant of the vehicle may be included in the in-vehicle wire LAN as the information/control devices Mx. For example, ECUs for controlling the vehicle may be included in the in-vehicle wire LAN.

In the above embodiment and modifications, a signal transmitted within the in-vehicle LAN may be an analog baseband signal such as an audio signal or a video signal instead of a digital baseband signal. In this case, in the terminal Mc, a carrier wave is amplitude-modulated or frequency-modulated using the analog signal when the analog signal is transmitted via radio waves.

If the internet protocol (IP) is employed by the in-vehicle LAN in the above embodiment and modifications, either of IPv4 and IPv6 may be employed for assigning IP addresses to the information/control devices Mx.

In the above embodiment and modifications, the in-vehicle wire LAN may be linked with any combination of another in-vehicle LAN, RSUS, and an in-vehicle wireless LAN.

Further in the above embodiment and modifications, the communication system may be used for communication other than the vehicle communication. For example, a wire LAN established by connecting computers in an office may be linked with a wireless LAN established in the same office via the terminals Mc.

The present invention is not limited to the above embodiment and modifications, but may be variously embodied within the scope of the invention.

What is claimed is:

1. A terminal connected to a wire communication network for radio communication, wherein said terminal includes at least one of transmitter means and receiver means, wherein said transmitter means receives a first baseband signal in a particular format from said wire communication network, and modulates a carrier wave using the received first baseband signal into a transmission signal without translating the particular format of the first baseband signal into a different format, wherein the transmission signal is transmitted via a transmitting antenna, wherein said receiver means receives a signal via a receiving antenna, and demodulates the received signal into a second baseband signal, wherein the second baseband signal is transmitted from said receiver means to said wire communication network without translating a format of the second baseband signal into a different format, wherein said wire communication network includes an optical fiber link for transmitting a signal within said wire communication network, wherein the first baseband signal received by said transmitter is an optical signal, and wherein the second baseband signal transmitted from said receiver means is an optical signal, wherein said transmitter means includes a light controlled oscillator for generating the carrier wave of a predetermined nominal frequency, wherein the first baseband signal received by said transmitter means is applied to said light controlled oscillator, and wherein said light controlled oscillator generates, as the transmission signal, a signal of a frequency shifted from the predetermined nominal frequency according to an intensity of the applied first baseband signal.

2. A terminal connected to a wire communication network for radio communication,
wherein said terminal includes at least one of transmitter means and receiver means,
wherein said transmitter means receives a first baseband signal in a particular format from said wire communication network, and modulates a carrier wave using the received first baseband signal into a transmission signal without translating the particular format of the first baseband signal into a different format,
wherein the transmission signal is transmitted via a transmitting antenna,
wherein said receiver means receives a signal via a receiving antenna, and demodulates the received signal into a second baseband signal,
wherein the second baseband signal is transmitted from said receiver means to said wire communication network without translating a format of the second baseband signal into a different format,
wherein said wire communication network includes an optcal fiber link for transmitting a signal within said wire communication network,
wherein the first baseband signal received by said transmitter is an optical signal, and wherein the second baseband signal transmitted from said receiver means is an optical signal,
wherein said transmitter means includes a voltage controlled oscillator for generating the carrier wave of a predetermined nominal frequency and an optical/electrical converter,
wherein the first baseband signal received by said transmitter means is applied to said optical/electrical converter,
wherein said optical/electrical converter generates an electrical signal of a voltage variable with an intensity of the applied first baseband signal, and
wherein said voltage controlled oscillator receives the electrical signal and generates, as the transmission signal, a signal of a frequency shifted from the predetermined nominal frequency according to the voltage level of the received electrical signal.

3. A terminal as in claim 1,
wherein the receiver means includes a demodulator for demodulating the received signal into an electrical baseband signal and an electrical/optical converter, and
wherein said electrical/optical converter receives the electrical baseband signal and generates, as the second baseband signal, an optical signal of an intensity variable with an voltage of the received electrical baseband signal.

4. A terminal as in claim 1,
wherein said wire communication network to which said terminal is connected is an in-vehicle LAN established in a vehicle.

5. A terminal as in claim 4,
wherein said transmitting antenna is arranged on at least one of a front end, a rear end, a right side, and a left side of the vehicle, and
wherein said receiving antenna is arranged on at least one of the front end, the rear end, the right side, and the left side of the vehicle.

6. A method for transmitting a signal in a predetermined format from a wire communication network to a radio device via radio waves, comprising the steps of:
modulating a carrier wave of a radio frequency using the signal into a transmission signal in a terminal as recited in claim 2; and
transmitting the transmission signal to said radio device.

7. A method as in claim 6,
wherein said radio device is a second terminal connected to another wire communication network for radio communication.

8. A method as in claim 6,
wherein said radio device is a base station of a wireless communication network.

9. A terminal as in claim 2,
wherein the receiver means includes a demodulator for demodulating the received signal into an electrical baseband signal and an electrical/optical converter, and
wherein the receiver means includes a demodulator for demodulating the received signal into an electrical baseband signal and an electrical/optical converter, and
wherein said electrical/optical converter receives the electrtical baseband signal and generates, as the second baseband signal, an optical signal of an intensity variable with an voltage of the received electrical baseband signal.

10. A terminal as in claim 2,
wherein said wire communication network to which said terminal is connected is an in-vehicle LAN established in a vehicle.

11. A terminal as in claim 10,
wherein said transmitting antenna is arranged on at least one of a front end, a rear end, a right side, and a left side of the vehicle, and
wherein said receiving antenna is arranged on at least one of the front end, the rear end, the right side, and the left side of the vehicle.

12. A communication system comprising a wire communication network having at least one terminal as recited in claim 2 connected thereto.

13. A terminal as in claim 2, wherein the predefined format is at least one of a frame format or a signal format.

* * * * *